(12) United States Patent
Hasegawa et al.

(10) Patent No.: US 9,290,834 B2
(45) Date of Patent: Mar. 22, 2016

(54) HIGH-STRENGTH GALVANIZED STEEL SHEET HAVING EXCELLENT FORMABILITY AND CRASHWORTHINESS

(75) Inventors: Hiroshi Hasegawa, Fukuyama (JP); Tatsuya Nakagaito, Chiba (JP); Shinjiro Kaneko, Chiba (JP); Yasunobu Nagataki, Chiyoda-ku (JP); Yoshitsugu Suzuki, Fukuyama (JP)

(73) Assignee: JFE Steel Corporation, Tokyo (JP)

(*) Notice: Subject to any disclaimer, the term of this patent is extended or adjusted under 35 U.S.C. 154(b) by 0 days.

(21) Appl. No.: 14/349,503

(22) PCT Filed: Oct. 7, 2011

(86) PCT No.: PCT/JP2011/073755
§ 371 (c)(1),
(2), (4) Date: Jul. 21, 2014

(87) PCT Pub. No.: WO2013/051160
PCT Pub. Date: Apr. 11, 2013

(65) Prior Publication Data
US 2014/0377584 A1  Dec. 25, 2014

(51) Int. Cl.
*B32B 15/01* (2006.01)
*B32B 15/04* (2006.01)
*B32B 15/18* (2006.01)
*C21D 8/02* (2006.01)
*C23C 2/02* (2006.01)
*C23C 2/06* (2006.01)
*C23C 2/28* (2006.01)
*C21D 9/46* (2006.01)
*C22C 38/14* (2006.01)
*C22C 38/58* (2006.01)
*C22C 38/00* (2006.01)
*C22C 38/02* (2006.01)
*C22C 38/04* (2006.01)
*C22C 38/06* (2006.01)
*C21D 8/12* (2006.01)
*C22C 38/08* (2006.01)
*C22C 38/12* (2006.01)
*C22C 38/16* (2006.01)
*C22C 38/28* (2006.01)
*C22C 38/32* (2006.01)
*C22C 38/38* (2006.01)

(52) U.S. Cl.
CPC ............... *C23C 2/02* (2013.01); *B32B 15/013* (2013.01); *C21D 8/0263* (2013.01); *C21D 8/0284* (2013.01); *C21D 8/1272* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/14* (2013.01); *C22C 38/58* (2013.01); *C23C 2/06* (2013.01); *C23C 2/28* (2013.01); *C21D 8/0226* (2013.01); *C21D 8/0236* (2013.01); *C21D 2211/001* (2013.01); *C21D 2211/008* (2013.01); *C22C 38/005* (2013.01); *C22C 38/08* (2013.01); *C22C 38/12* (2013.01); *C22C 38/16* (2013.01); *C22C 38/28* (2013.01); *C22C 38/32* (2013.01); *C22C 38/38* (2013.01); *Y10T 428/12799* (2015.01); *Y10T 428/12972* (2015.01)

(58) Field of Classification Search
CPC .............. C23C 2/02; C23C 2/06; C23C 2/28; C23C 2/26; C23C 2/285; C23C 38/002; C23C 38/06; C23C 38/001; C23C 38/04; C23C 38/02; C23C 38/14; C23C 38/58; C23C 38/005; C23C 38/38; C23C 38/00; C23C 38/26; C23C 38/30; C23C 38/10; C23C 38/60; C23C 38/24; C23C 38/008; C23C 38/08; C23C 38/32; C23C 38/28; C23C 38/16; C23C 38/12; B32B 15/013; Y10T 428/12972; Y10T 428/12799
See application file for complete search history.

(56) References Cited

U.S. PATENT DOCUMENTS

| | | | |
|---|---|---|---|
| 2004/0074575 | A1 | 4/2004 | Kashima |
| 2010/0218857 | A1* | 9/2010 | Nakagaito et al. ............ 148/533 |
| 2011/0198002 | A1 | 8/2011 | Nakagaito |

FOREIGN PATENT DOCUMENTS

| | | |
|---|---|---|
| JP | H03-94017 A | 4/1991 |
| JP | H06-108152 A | 4/1994 |
| JP | H09-111396 A | 4/1997 |
| JP | 2001-011565 A | 1/2001 |
| JP | 2005336526 | 12/2005 |
| JP | 2008-231480 A | 10/2008 |
| JP | 2009-209450 A | 9/2009 |
| JP | 2010-126770 A | 6/2010 |

OTHER PUBLICATIONS

International Search Report mailed Jan. 17, 2012 in corresponding International Application No. PCT/JP2011/073755.
European Search Report mailed Jul. 2, 2015 in European Application No. 11873599.2.
Sugimoto, K-I et al., "Fatigue strength of newly developed high-strength low alloy TRIP-aided steels with good hardenability," Procedia Engineering, vol. 2, No. 1, Apr. 1, 2010, pp. 359-362.

* cited by examiner

*Primary Examiner* — Michael E La Villa
(74) *Attorney, Agent, or Firm* — RatnerPrestia

(57) ABSTRACT

A galvanized steel sheet has a composition containing, by mass %, C: 0.05% or more and 0.5% or less, Si: 0.01% or more and 2.5% or less, Mn: 0.5% or more and 3.5% or less, P: 0.003% or more and 0.100% or less, S: 0.02% or less, Al: 0.010% or more and 0.5% or less, B: 0.0002% or more and 0.005% or less, Ti: 0.05% or less, a relationship of Ti>4N being satisfied, and the balance comprising Fe and inevitable impurities, and a microstructure containing 60% or more and 95% or less of tempered martensite in terms of area ratio and 5% or more and 20% or less of retained austenite in terms of area ratio.

16 Claims, No Drawings

HIGH-STRENGTH GALVANIZED STEEL SHEET HAVING EXCELLENT FORMABILITY AND CRASHWORTHINESS

CROSS REFERENCE TO RELATED APPLICATIONS

This is the U.S. National Phase application of PCT International Application No. PCT/JP2011/073755, filed Oct. 7, 2011, which claims priority to Japanese Patent Application No. 2010-170794, filed Jul. 29, 2010, the disclosures of each of these applications being incorporated herein by reference in their entireties for all purposes.

FIELD OF THE INVENTION

The present invention relates to a high-strength galvanized steel sheet having excellent formability and crashworthiness, the steel sheet being suitable for a material of automotive parts and the like, and a method for manufacturing the same.

BACKGROUND OF THE INVENTION

In the automotive industry, in order to reduce the $CO_2$ emission from the standpoint of global environmental conservation, improving the fuel consumption of automobiles by reducing the weight of automobile bodies while maintaining the strength thereof has been always an important issue. In order to reduce the weight of automobile bodies while maintaining the strength thereof, it is effective to reduce the thickness of a steel sheet used as a material of automotive parts by increasing the strength of the steel sheet.

Meanwhile, many of automotive parts composed of a steel sheet material are formed by press forming, burring, or the like. Therefore, it is desired that a high-strength steel sheet used as a material of automotive parts have excellent formability, namely, ductility and stretch flangeability in addition to a desired strength.

Furthermore, in a material of automotive parts, one of properties on which the greatest importance should be placed is crashworthiness. At the time of the crash of an automobile, each position of the automobile composed of a steel sheet is subjected to a strain rate of no less than about $10^3$/s. Accordingly, it is necessary to ensure crash safety of automobiles by applying, to automotive parts such as a pillar, a member, and a bumper, a high-strength steel sheet having crashworthiness sufficient to ensure security of an occupant in case of crash during driving of the automobiles, that is, a high-strength steel sheet having crashworthiness in which excellent crash energy absorption is exhibited even in the case where the steel sheet is subjected to such a high strain rate at the time of the crash.

For the above reason, particularly in the automotive industry, there has been a strong desire to develop a high-strength steel sheet having not only strength but also formability such as ductility and stretch flangeability, and further crashworthiness. Thus, many research and development have been conducted to date, and various technologies have been proposed.

For example, Patent Literature 1 has proposed a technology related to a ferrite-martensite dual-phase (DP) steel sheet, in which a yield stress at a strain rate of $10^3$/s is increased by adjusting the average grain diameter and the volume ratio of each of ferrite and martensite to improve crashworthiness. However, the reason why the DP steel sheet, which originally has a low yield strength, exhibits high energy absorption is that a relatively large work strain is introduced by press forming or the like, and strain aging occurs in a subsequent paint-baking step, thereby significantly increasing the yield stress. Therefore, at a position (in a part) that is subjected to a light degree of forming such as bending, since the work strain to be introduced is small, a significant effect of increasing the yield stress cannot be expected after the paint-baking step. Thus, there is a problem in that sufficient crash energy absorption is not necessarily exhibited.

In addition, the DP steel sheet is characterized by exhibiting excellent crash energy absorption in a high strain range of 10% to 30%, but the DP steel sheet does not exhibit sufficient crash energy absorption in a low strain range. Thus, the DP steel sheet is suitable for use in a position (part) that absorbs crash energy by a certain degree of deformation, such as a position (part) that is subjected to frontal crash. However, crashworthiness of the DP steel sheet is insufficient when the DP steel sheet is applied to a position (part) that requires high crash energy absorption in a small strain range without significant deformation from the standpoint of protecting an occupant, such as a position (part) that is subjected to side crash.

Patent Literature 2 has proposed a technology related to a transformation induced plasticity (TRIP) steel sheet that utilizes transformation induced plasticity of retained austenite, in which the amount of bake hardening is increased by adjusting the amount of bainite to improve crash energy absorption. However, as in the DP steel sheet, the TRIP steel sheet also has a problem in that the TRIP steel sheet does not necessarily exhibit sufficient crash energy absorption at a position (in a part) that is subjected to a light degree of forming such as bending, and is not suitable for use in a position (part) that requires high crash energy absorption in a small strain range.

In relation to the above related art, Patent Literature 3 has proposed a technology related to a cold-rolled steel sheet having a microstructure mainly composed of ferrite, in which crashworthiness of the steel sheet is improved by adjusting the volume ratio and the average crystal grain diameter of a low-temperature transformed phase composed of at least one of martensite, bainite, and retained austenite, and the average distance between the low-temperature transformed phases.

However, in the technology proposed in Patent Literature 3, steel sheet properties other than crashworthiness are insufficient. In this technology, since the steel sheet has a microstructure mainly compose of ferrite, the tensile strength (TS) of the steel sheet is less than 1,200 MPa, and thus a satisfactory strength is not obtained. In addition, in this technology, stretch flangeability of the steel sheet is not examined, and thus this steel sheet may not have satisfactory formability.

Since automotive parts are often used in a severe corrosion environment, recently, a high-strength galvanized steel sheet, which has a high strength and excellent corrosion resistance, has been widely used as a material of automotive parts. Furthermore, nowadays, a further increase in the strength has been promoted in materials of automotive parts, and the application of a steel sheet having a tensile strength of 1,200 MPa or more has been studied.

In response to the above requirement, for example, Patent Literature 4 has proposed a technology related to a steel sheet having a microstructure mainly composed of tempered martensite, in which not only an increase in the strength but also an improvement in ductility and stretch flangeability is achieved by adjusting the area ratios of martensite, bainite, and retained austenite. According to this technology, it is possible to obtain a galvanized steel sheet having a high strength, i.e., tensile strength (TS): 1,200 MPa or more and excellent workability.

However, in the technology proposed in Patent Literature 4, crashworthiness of the steel sheet is not examined. Therefore, according to this technology, although a galvanized steel sheet having a high strength and excellent formability is obtained, crashworthiness thereof may not be sufficient. Thus, in particular, it may be possible to further improve crash energy absorption in a small strain range.

PATENT LITERATURE

[PTL 1] Japanese Unexamined Patent Application Publication No. 9-111396
[PTL 2] Japanese Unexamined Patent Application Publication No. 2001-011565
[PTL 3] Japanese Unexamined Patent Application Publication No. 2008-231480
[PTL 4] Japanese Unexamined Patent Application Publication No. 2009-209450

SUMMARY OF THE INVENTION

As described above, with regard to a high-strength galvanized steel sheet in the related art, there is a problem in that a steel sheet having not only a tensile strength (TS) of 1,200 MPa or more but also excellent formability (ductility and stretch flangeability) and crashworthiness cannot be obtained, and that, in particular, sufficient studies on the crashworthiness have not yet been conducted. From the standpoint of ensuring security of an occupant, which is considered to be a matter on which the greatest importance should be placed in the automotive industry, in order to apply such a steel sheet having a tensile strength of 1,200 MPa or more to automotive parts that require crash energy absorption, it is essential to improve crashworthiness.

The present invention aims to provide a high-strength galvanized steel sheet that advantageously solves the above-described problem in the related art, and that is suitably used as a material for automotive parts, specifically, that have not only a tensile strength (TS) of 1,200 MPa or more and formability (ductility and stretch flangeability) such as a hole expansion ratio ($\lambda$) of 50% or more but also crashworthiness, and a method for manufacturing the same.

In order to solve the above problem, the inventors of the present invention conducted intensive studies on various factors that affect crashworthiness of a high-strength galvanized steel sheet besides the strength and formability (ductility and stretch flangeability) thereof. As a result, the inventors of the present invention found the following.

1) By appropriately adjusting the steel composition, in particular, by incorporating B and adjusting the proportion of Ti content and N content, and by obtaining a steel microstructure which mainly comprises tempered martensite and which contains retained austenite in a desired area ratio, or further contains ferrite and martensite in desired area ratios, both an increase in the strength and an improvement in formability (ductility and stretch flangeability) can be achieved. Furthermore, by refining the tempered martensite (average grain diameter: 5 μm or less), crashworthiness of the steel sheet is significantly improved.

2) In manufacturing a high-strength galvanized steel sheet from a steel having the steel composition of 1) above, a high-strength galvanized steel sheet having the steel microstructure of 1) above is obtained by hot-rolling a steel slab at a finish rolling temperature of an $A_3$ transformation point or higher, cooling the resulting steel sheet to a coiling temperature at an average cooling rate of 30° C./s or more, coiling the steel sheet at a coiling temperature of 300° C. or higher and 550° C. or lower to form a hot-rolled steel sheet, performing desired heat treatment on the hot-rolled steel sheet or a cold-rolled steel sheet obtained by cold-rolling the hot-rolled steel sheet, the heat treatment including heating the steel sheet to an annealing temperature of ($A_3$ transformation point−20° C.) or higher and ($A_3$ transformation point+80° C.) or lower at an average heating rate of 5° C./s or more in a temperature range of 500° C. or higher and an $A_1$ transformation point or lower and soaking the steel sheet, cooling the steel sheet, and then reheating and soaking the steel sheet, and then galvanizing the steel sheet.

In the present invention, the reason why crashworthiness is improved by refining the tempered martensite is not exactly clear. However, it is believed that when the grain diameter of the tempered martensite is small, in dynamic deformation of a steel sheet caused at the time of the crash of an automobile, the number of propagation paths of cracks increases, crash energy is dispersed, and it becomes possible to absorb lager crash energy.

The reason why tempered martensite is refined under the above manufacturing conditions is also not exactly clear, but is believed as follows: By coiling a steel sheet at a coiling temperature of 300° C. or higher and 550° C. or lower to form a hot-rolled steel sheet, the steel microstructure before the annealing treatment becomes bainite or martensite having a high dislocation density, and thus the number of nucleation sites of austenite increases. Furthermore, by heating the steel sheet to an annealing temperature at an average heating rate of 5° C./s or more in the temperature range of 500° C. or higher and the $A_1$ transformation point or lower, austenite formed from the bainite or martensite having the high dislocation density by a reverse transformation has a very fine microstructure. When this very fine austenite is maintained at the annealing temperature and then rapidly cooled to a low-temperature range, part of the austenite is transformed to a very fine martensite, and the remaining part thereof remains as untransformed austenite. Subsequently, by heating the steel sheet to a desired reheating temperature and holding the steel sheet at the temperature, the martensite is tempered and becomes tempered martensite. In this case, since the martensite has a very fine microstructure, the tempered martensite obtained by the tempering also has a fine microstructure.

The present invention has been completed on the basis of the above finding, and the gist thereof includes the following.
(1) A high-strength galvanized steel sheet having excellent formability and crashworthiness includes a substrate and a galvanized layer provided on a surface of the substrate, wherein the substrate has a composition containing, by mass %, C: 0.05% or more and 0.5% or less, Si: 0.01% or more and 2.5% or less, Mn: 0.5% or more and 3.5% or less, P: 0.003% or more and 0.100% or less, S: 0.02% or less, Al: 0.010% or more and 0.5% or less, B: 0.0002% or more and 0.005% or less, Ti: 0.05% or less, the relationship Ti>4N being satisfied, and the balance comprising Fe and inevitable impurities, and a microstructure containing 60% or more and 95% or less of tempered martensite in terms of area ratio and 5% or more and 20% or less of retained austenite in terms of area ratio, the tempered martensite having an average grain diameter of 5 μm or less.
(2) In the high-strength galvanized steel sheet according to (1), the microstructure further contains 10% or less (including 0%) of ferrite in terms of area ratio and/or 10% or less (including 0%) of martensite in terms of area ratio.
(3) In the high-strength galvanized steel sheet according to (1) or (2), the composition further contains at least one selected from the group consisting of, by mass %, Cr: 0.005% or more and 2.00% or less, Mo: 0.005% or more and 2.00% or less, V: 0.005% or more and 2.00% or less, Ni: 0.005% or more and 2.00% or less, and Cu: 0.005% or more and 2.00% or less.

(4) In the high-strength galvanized steel sheet according to any one of (1) to (3), the composition further contains, by mass %, Nb: 0.01% or more and 0.20% or less.

(5) In the high-strength galvanized steel sheet according to any one of (1) to (4), the composition further contains, by mass %, at least one selected the group consisting of Ca: 0.001% or more and 0.005% or less and REM: 0.001% or more and 0.005% or less.

(6) In the high-strength galvanized steel sheet according to any one of (1) to (5), the galvanized layer is a galvannealed layer.

(7) A method for manufacturing a high-strength galvanized steel sheet having excellent formability and crashworthiness includes:

hot-rolling a steel slab having a composition containing, by mass %, C: 0.05% or more and 0.5% or less, Si: 0.01% or more and 2.5% or less, Mn: 0.5% or more and 3.5% or less, P: 0.003% or more and 0.100% or less, S: 0.02% or less, Al: 0.010% or more and 0.5% or less, B: 0.0002% or more and 0.005% or less, Ti: 0.05% or less, the relationship Ti>4N being satisfied, and the balance comprising Fe and inevitable impurities at a finish rolling temperature of an $A_3$ transformation point or higher;

after the completion of finish rolling, subsequently cooling the resulting steel sheet to a coiling temperature at an average cooling rate of 30° C./s or more;

coiling the steel sheet at the coiling temperature of 300° C. or higher and 550° C. or lower to form a hot-rolled steel sheet;

then performing heat treatment on the hot-rolled steel sheet, the heat treatment including heating the hot-rolled steel sheet to an annealing temperature of ($A_3$ transformation point−20° C.) or higher and ($A_3$ transformation point+80° C.) or lower at an average heating rate of 5° C./s or more in a temperature range of 500° C. or higher and an $A_1$ transformation point or lower, holding the steel sheet at the annealing temperature for 10 seconds or more, then cooling the steel sheet from 750° C. to a temperature range of 100° C. or higher and 350° C. or lower at an average cooling rate of 30° C./s or more, subsequently reheating the steel sheet to a temperature of 300° C. or higher and 600° C. or lower, and holding the steel sheet at the temperature for 10 seconds or more and 600 seconds or less;

then galvanizing the steel sheet, and optionally performing an alloying treatment.

(8) A method for manufacturing a high-strength galvanized steel sheet having excellent formability and crashworthiness includes hot-rolling a steel slab having a composition containing, by mass %, C: 0.05% or more and 0.5% or less, Si: 0.01% or more and 2.5% or less, Mn: 0.5% or more and 3.5% or less, P: 0.003% or more and 0.100% or less, S: 0.02% or less, Al: 0.010% or more and 0.5% or less, B: 0.0002% or more and 0.005% or less, Ti: 0.05% or less, the relationship Ti>4N being satisfied, and the balance comprising Fe and inevitable impurities at a finish rolling temperature of an $A_3$ transformation point or higher;

after the completion of finish rolling, subsequently cooling the resulting steel sheet to a coiling temperature at an average cooling rate of 30° C./s or more;

coiling the steel sheet at the coiling temperature of 300° C. or higher and 550° C. or lower to form a hot-rolled steel sheet;

then pickling the hot-rolled steel sheet and then cold-rolling the hot-rolled steel sheet to form a cold-rolled steel sheet;

performing heat treatment on the cold-rolled steel sheet, the heat treatment including heating the cold-rolled steel sheet to an annealing temperature of ($A_3$ transformation point−20° C.) or higher and ($A_3$ transformation point+80° C.) or lower at an average heating rate of 5° C./s or more in a temperature range of 500° C. or higher and an $A_1$ transformation point or lower, holding the steel sheet at the annealing temperature for 10 seconds or more, then cooling the steel sheet from 750° C. to a temperature range of 100° C. or higher and 350° C. or lower at an average cooling rate of 30° C./s or more, reheating the steel sheet to a temperature of 300° C. or higher and 600° C. or lower, and holding the steel sheet at the temperature for 10 seconds or more and 600 seconds or less;

then galvanizing the steel sheet, and optionally performing an alloying treatment.

(9) In the method for manufacturing a high-strength galvanized steel sheet according to (7) or (8), the composition further contains at least one selected from the group consisting of, by mass %, Cr: 0.005% or more and 2.00% or less, Mo: 0.005% or more and 2.00% or less, V: 0.005% or more and 2.00% or less, Ni: 0.005% or more and 2.00% or less, and Cu: 0.005% or more and 2.00% or less.

(10) In the method for manufacturing a high-strength galvanized steel sheet according to any one of (7) to (9), the composition further contains, by mass %, Nb: 0.01% or more and 0.20% or less.

(11) In the method for manufacturing a high-strength galvanized steel sheet according to any one of (7) to (10), the composition further contains, by mass %, at least one selected from the group consisting of Ca: 0.001% or more and 0.005% or less and REM: 0.001% or more and 0.005% or less.

According to the present invention, a high-strength galvanized steel sheet having a tensile strength (TS) of 1,200 MPa or more, and excellent formability (ductility and stretch flangeability) and crashworthiness, the steel sheet being suitable for a material of automotive parts, can be obtained, and thus, a significant industrial advantage can be achieved.

DESCRIPTION OF EMBODIMENTS OF THE INVENTION

The present invention will now be described in detail with reference to exemplary embodiments. A steel sheet of the present invention is a galvanized steel sheet including a substrate and a galvanized layer provided on a surface of the substrate.

First, a description will be made of reasons for selecting the microstructure of a steel sheet serving as the substrate of the steel sheet of the present invention.

A steel sheet serving as a substrate of a high-strength galvanized steel sheet of the present invention preferably has a microstructure containing 60% or more and 95% or less of tempered martensite in terms of area ratio and 5% or more and 20% or less of retained austenite in terms of area ratio, or further containing 10% or less (including 0%) of ferrite in terms of area ratio and/or 10% or less (including 0%) of martensite in terms of area ratio, the tempered martensite having an average grain diameter of 5 μm or less.

Tempered martensite: 60% or more and 95% or less in terms of area ratio

In the present invention, the formation of tempered martensite is preferred in order to ensure the strength and formability, in particular, stretch flangeability of the steel sheet. When the area ratio of tempered martensite is less than 60%, it is difficult to achieve both a tensile strength (TS) of 1,200 MPa or more and a hole expansion ratio (λ) of 50% or more. On the other hand, when the area ratio of tempered martensite exceeds 95%, the total elongation (EL) significantly decreases and satisfactory formability cannot be achieved. Accordingly, the area ratio of tempered martensite is set to 60% or more and 95% or less. Note that the area ratio of tempered martensite is preferably 60% or more and 90% or less, and more preferably 70% or more and 90% or less.

Retained austenite: 5% or more and 20% or less in terms of area ratio

In the present invention, the formation of retained austenite is preferred in order to ensure formability of the steel sheet. Retained austenite is effective in improving the total elongation (EL). In order to sufficiently exhibit this effect, it is necessary to set the area ratio of retained austenite to 5% or more. On the other hand, when the area ratio of retained austenite exceeds 20%, the hole expansion ratio ($\lambda$) significantly decreases and stretch flangeability deteriorates. Accordingly, the area ratio of retained austenite is set to 5% or more and 20% or less. Note that the area ratio of retained austenite is preferably 10% or more and 18% or less.

Furthermore, in the present invention, the microstructure of the steel sheet (substrate) is preferably a dual-phase microstructure including tempered martensite and retained austenite. In the case where the steel sheet (substrate) contains ferrite and/or martensite, it is necessary to limit the amounts thereof to the ranges described below.

Ferrite: 10% or less (including 0%) in terms of area ratio

When the area ratio of ferrite exceeds 10%, it is difficult to achieve both a tensile strength (TS) of 1,200 MPa or more and a hole expansion ratio ($\lambda$) of 50% or more. Accordingly, the area ratio of ferrite is set to 10% or less (including 0%).

Martensite: 10% or less (including 0%) in terms of area ratio

When the area ratio of martensite exceeds 10%, the hole expansion ratio ($\lambda$) significantly decreases and stretch flangeability deteriorates. Accordingly, the area ratio of martensite is set to 10% or less (including 0%).

Furthermore, in the present invention, other phases (e.g., bainite and pearlite) may also be contained as long as tempered martensite, retained austenite, ferrite, and martensite satisfy the respective area ratios described above. However, from the standpoint of the strength, the total area ratio of the other phases is preferably 15% or less.

Average grain diameter of tempered martensite: 5 μm or less

In the present invention, it is advantageous to refine the tempered martensite in order to ensure crashworthiness. As described above, it is believed that when the grain diameter of tempered martensite is made small, in dynamic deformation of a steel sheet caused at the time of the crash of an automobile, the number of propagation paths of cracks increases, crash energy is dispersed, and it becomes possible to absorb lager crash energy. When the average grain diameter of tempered martensite exceeds 5 μm, the above-described effect of improving crashworthiness cannot be sufficiently obtained. Accordingly, in embodiments of the present invention, the average grain diameter of tempered martensite is set to 5 μm or less. Note that the average grain diameter of tempered martensite is preferably 3 μm or less.

Herein, in the present invention, the terms "area ratio of tempered martensite", "area ratio of ferrite", "area ratio of martensite", and "area ratios of the other phases" refer to the area proportion of respective phases to an observation area in the case where the microstructure of a steel sheet serving as a substrate is observed. Each of the area ratios is determined as follows. A cross section in the thickness direction of the steel sheet is polished, and then corroded with 3% nital. Subsequently, a position located at ¼ from an edge of the steel sheet in the thickness direction is observed with a scanning electron microscope (SEM) at a magnification of 1,500. Each of the area ratios is determined by image processing using Image-Pro manufactured by Media Cybernetics, Inc.

In the present invention, the area ratio of retained austenite is determined as follows. A steel sheet is polished to a position located at ¼ from an edge of the steel sheet in the thickness direction, and further polished by 0.1 mm by chemical polishing. With regard to this polished surface, the integrated reflection intensities of a (200) plane, a (220) plane, and a (311) plane of fcc iron (austenite) and a (200) plane, a (211) plane, and a (220) plane of bcc iron (ferrite) are measured with an X-ray diffractometer using the K$\alpha$ line of Mo. A proportion of austenite is determined from an intensity ratio of the integrated reflection intensity obtained from each the planes of fcc iron (austenite) to the integrated reflection intensity obtained from each of the planes of bcc iron (ferrite). This proportion of austenite is defined as the area ratio of retained austenite.

In the present invention, the average grain diameter of tempered martensite is determined as follows. A cross section parallel to the rolling direction of the steel sheet is observed with a scanning electron microscope (SEM) at a magnification of 1,500. The total of the area of the tempered martensite present in a field of view is divided by the number of tempered martensite crystal grains to determine the average area of the tempered martensite crystal grains. The ½ power of the average area of the tempered martensite crystal grains is defined as the average grain diameter (corresponding to one side of a square (square approximation)).

Next, the reasons for selecting the composition of the steel sheet (substrate) of the present invention will be described. Note that the notation of "%" representing a composition below means "mass %" unless otherwise stated.

C: 0.05% or more and 0.5% or less

Carbon (C) is an essential element in order to form a low-temperature transformed phase such as tempered martensite and to increase the tensile strength (TS). When the C content is less than 0.05%, it is difficult to ensure 60% or more tempered martensite in terms of area ratio. On the other hand, when the C content exceeds 0.5%, the total elongation (EL) and spot weldability are degraded. Accordingly, the C content is set to 0.05% or more and 0.5% or less. Preferably, the C content is 0.1% or more and 0.3% or less.

Si: 0.01% or more and 2.5% or less

Silicon (Si) is an element that is effective in improving the balance between the tensile strength (TS) and the total elongation (EL) by contributing to solid solution hardening of a steel. In addition, Si is an element that is effective in forming retained austenite. In order to achieve these effects, it is necessary to set the Si content to 0.01% or more. On the other hand, a Si content exceeding 2.5% causes a decrease in the total elongation (EL) and deterioration of the surface quality and weldability. Accordingly, the Si content is set to 0.01% or more and 2.5% or less. Preferably, the Si content is 0.7% or more and 2.0% or less.

Mn: 0.5% or more and 3.5% or less

Manganese (Mn) is an element that is effective in increasing the strength of a steel, and is an element that promotes the formation of a low-temperature transformed phase such as martensite in a cooling step after hot rolling and a cooling step from an annealing temperature described below. In order to achieve these effects, it is necessary to set the Mn content to 0.5% or more.

On the other hand, when the Mn content exceeds 3.5%, the total elongation (EL) significantly decreases, thereby deteriorating formability. Accordingly, the Mn content is set to 0.5% or more and 3.5% less. Preferably, the Mn content is 1.5% or more and 3.0% less.

P: 0.003% or more and 0.100% or less

Phosphorus (P) is an element that is effective in increasing the strength of a steel. In order to achieve this effect, it is necessary to set the P content to 0.003% or more. On the other hand, when the P content exceeds 0.100%, crashworthiness of the steel is decreased by grain boundary segregation of P. Accordingly, the P content is set to 0.003% or more and 0.100% or less.

S: 0.02% or less

Sulfur (S) is a harmful element that is present as an inclusion such as MnS and deteriorates crashworthiness and weldability. Therefore, it is preferable to reduce the S content as much as possible in the present invention. However, in consideration of the manufacturing cost, the S content is set to 0.02% or less.

Al: 0.010% or more and 0.5% or less

Aluminum (Al) is an element that acts as a deoxidizer, and is preferably added in a deoxidizing step in the steelmaking. In order to achieve this effect, it is necessary to set the Al content to 0.010% or more. On the other hand, when the Al content exceeds 0.5% and a continuous casting process is employed, a risk of slab cracking during continuous casting increases. Accordingly, the Al content is set to 0.010% or more and 0.5% or less. Preferably, the Al content is 0.02% or more and 0.05% or less.

B: 0.0002% or more and 0.005% or less

Boron (B) is an element that is effective in suppressing the formation of ferrite from austenite grain boundaries and forming a low-temperature transformed phase in a cooling step after hot rolling and a cooling step from an annealing temperature described below. In order to achieve this effect, it is necessary to set the B content to 0.0002% or more. On the other hand, when the B content exceeds 0.005%, the effect is saturated, and thus the effect that is worth the cost is not obtained.

Accordingly, the B content is set to 0.0002% or more and 0.005% or less. Preferably, the B content is 0.0005% or more and 0.003% or less.

Ti: 0.05% or less, and Ti>4N

Titanium (Ti) is an element that is necessary to effectively utilize B, which has the above-described effect, by forming a Ti nitride to fix N in a steel. Boron (B) exhibits the above effect in a solid-solution state, but is easily bonded to N in the steel and precipitates in the form of BN. Boron in the form of the precipitated state loses the above effect. Consequently, in the present invention, by incorporating Ti, which has an affinity with N stronger than the affinity of B with N, nitrogen is fixed in a high-temperature range so as to suppress the precipitation of BN. In order to achieve this effect, it is necessary to set the Ti content to be larger than 4×N content (mass %). On the other hand, even if Ti is excessively incorporated, the effect of suppressing the precipitation of BN is saturated, and the total elongation (EL) decreases. Accordingly, the Ti content is set to 0.05% or less and so as to satisfy the relationship Ti>4N.

The basic composition in embodiments of the present invention has been described above. In addition to the above basic composition, at least one selected from the group consisting of Cr: 0.005% or more and 2.00% or less, Mo: 0.005% or more and 2.00% or less, V: 0.005% or more and 2.00% or less, Ni: 0.005% or more and 2.00% or less, and Cu: 0.005% or more and 2.00% or less may be contained.

Each of Cr, Mo, V, Ni, and Cu is an element that is effective in forming a low-temperature transformed phase such as martensite in a cooling step after hot rolling and a cooling step from an annealing temperature described below. In order to achieve this effect, it is preferable to incorporate at least one element selected from Cr, Mo, V, Ni, and Cu in an amount of each element of 0.005% or more. On the other hand, when the content of each of these elements exceeds 2.00%, the above effect is saturated, and thus the effect that is worth the cost is not obtained. Accordingly, the content of each of Cr, Mo, V, Ni, and Cu is preferably set to 0.005% or more and 2.00% or less.

Furthermore, in the present invention, 0.01% or more and 0.20% or less of Nb may be further contained in addition to the above basic composition.

Niobium (Nb) is an element that forms a carbonitride and thus that is effective in increasing the strength of a steel by precipitation hardening. In order to achieve this effect, it is preferable to set the Nb content to 0.01% or more. On the other hand, when the Nb content exceeds 0.20%, the effect of increasing the strength is saturated and the total elongation (EL) may decrease. Accordingly, the Nb content is preferably set to 0.01% or more and 0.20% or less.

In the present invention, in addition to the above basic composition, at least one selected from the group consisting of Ca: 0.001% or more and 0.005% or less and REM: 0.001% or more and 0.005% or less may be contained.

Each of Ca and a rare-earth metal (REM) is an element that is effective in controlling the form of a sulfide, and is an element that is effective in improving formability of a steel sheet. In order to achieve this effect, it is preferable to incorporate at least one element selected from of Ca and REM in an amount of each element of 0.001% or more. On the other hand, when the content of each of these elements exceeds 0.005%, the cleanliness of the steel may be adversely affected. Accordingly, the content of each of Ca and REM is preferably set to 0.001% or more and 0.005% or less.

In the steel sheet of the present invention, components other than the above are Fe and inevitable impurities.

Next, a method for manufacturing the steel sheet of the present invention will be described.

The high-strength galvanized steel sheet of the present invention is manufactured by, for example, hot-rolling a steel slab having the above-described composition at a finish rolling temperature of an $A_3$ transformation point or higher; after the completion of finish rolling, subsequently cooling the resulting steel sheet to a coiling temperature at an average cooling rate of 30° C./s or more; coiling the steel sheet at a coiling temperature of 300° C. or higher and 550° C. or lower to form a hot-rolled steel sheet; then performing heat treatment on the hot-rolled steel sheet, the heat treatment including heating the hot-rolled steel sheet to an annealing temperature of ($A_3$ transformation point−20° C.) or higher and ($A_3$ transformation point+80° C.) or lower at an average heating rate of 5° C./s or more in a temperature range of 500° C. or higher and an $A_1$ transformation point or lower, holding the steel sheet at the annealing temperature for 10 seconds or more, then cooling the steel sheet from 750° C. to a temperature range of 100° C. or higher and 350° C. or lower at an average cooling rate of 30° C./s or more, subsequently reheating the steel sheet to a temperature of 300° C. or higher and 600° C. or lower, and holding the steel sheet at the temperature for 10 seconds or more and 600 seconds or less; then galvanizing the steel sheet, and optionally performing an alloying treatment.

Alternatively, in the above method, the hot-rolled steel sheet after coiling may be pickled and then cold-rolled to form a cold-rolled steel sheet, the above-described heat treatment may be performed on the cold-rolled steel sheet, a galvanizing treatment may then be performed, and the alloying treatment may be optionally performed.

In the present invention, a method for producing a steel is not particularly limited, and a known producing method using a converter, an electric furnace, or the like, can be employed. From the standpoint of suppressing macro segregation, a steel slab is preferably manufactured by a continuous casting process. Alternatively, a slab may be manufactured by another known casting process such as an ingot making-slabbing process or a thin-slab continuous casting process. In hot-rolling a steel slab after casting, the steel slab may be once cooled to room temperature, and may then be reheated in a heating furnace and rolled. Alternatively, a steel slab after casting may be charged in a heating furnace without being cooled to room temperature, and may be heated and then rolled. Alternatively, in the case where a steel slab after casting maintains a temperature equal to or higher than a predetermined temperature, an energy-saving process, in which direct rolling is performed after slight retention of heat, may also be employed. Note that in the case where a steel slab is heated (or reheated) in a heating furnace, the heating temperature of the steel slab is preferably set to 1,100° C. or higher in order to dissolve a carbide and to suppress an increase in a rolling load during hot rolling. On the other hand, in order to suppress an increase in scale loss, the heating temperature of the steel slab is preferably set to 1,300° C. or lower.

Rough rolling and finish rolling are performed on the steel slab obtained as described above. In the present invention, conditions for the rough rolling need not be particularly limited. In performing the finish rolling, from the standpoint of suppressing a trouble during rolling, the trouble being concerned about when the heating temperature of the steel slab is low, a rough bar may be heated after the rough rolling. Furthermore, a so-called continuous rolling process may be employed in which rough bars are joined together and then subjected to continuous finish rolling.

In the present invention, it is preferred that a hot-rolled steel sheet (or a cold-rolled steel sheet) before an annealing treatment described below have a microstructure of bainite or martensite having a high dislocation density. For this purpose, the finish rolling temperature, cooling conditions subsequent to the finish rolling, and the coiling temperature are specified as follows.

Finish rolling temperature: $A_3$ transformation point or higher

When the finish rolling temperature is lower than an $A_3$ transformation point, ferrite is formed during rolling, and austenite formed during an annealing treatment and during a step of heating a hot-rolled steel sheet (or a cold-rolled steel sheet) to an annealing temperature, the annealing treatment and the step of heating being described below, is coarsened. As a result, a fine tempered martensite microstructure cannot be obtained as the microstructure of the substrate of the finally obtained galvanized steel sheet, and crashworthiness of the steel sheet decreases. In finish rolling, anisotropy of a hot-rolled steel sheet is increased, which may result in a decrease in formability after cold rolling and annealing. Setting the finish rolling temperature to the $A_3$ transformation point or higher is effective in solving this problem. Accordingly, the finish rolling temperature is set to the $A_3$ transformation point or higher.

In order to reduce the rolling load and to make the shape and the material quality of the hot-rolled steel sheet uniform, it is preferable to perform lubricated rolling, through which a coefficient of friction is adjusted to be 0.10 to 0.25, in all passes or some of the passes of the finish rolling.

Average cooling rate to coiling temperature: 30° C./s or more

After the finish rolling, when the average cooling rate to a coiling temperature is less than 30° C./s, ferrite is formed during cooling, and austenite formed during an annealing treatment and during a step of heating a hot-rolled steel sheet (or a cold-rolled steel sheet) to an annealing temperature, the annealing treatment and the step of heating being described below, is coarsened. As a result, a fine tempered martensite microstructure cannot be obtained as the microstructure of the substrate of the finally obtained galvanized steel sheet, and crashworthiness of the steel sheet decreases. Accordingly, the average cooling rate to the coiling temperature is set to 30° C./s or more.

Coiling temperature: 300° C. or higher and 550° C. or lower

When the coiling temperature exceeds 550° C., coarse ferrite and pearlite are formed, and austenite formed during an annealing treatment and during a step of heating a hot-rolled steel sheet (or a cold-rolled steel sheet) to an annealing temperature, the annealing treatment and the step of heating being described below, is coarsened. As a result, a fine tempered martensite microstructure cannot be obtained as the microstructure of the substrate of the finally obtained galvanized steel sheet, and crashworthiness of the steel sheet decreases. On the other hand, when the coiling temperature is lower than 300° C., the shape of the hot-rolled steel sheet is deteriorated. Accordingly, the coiling temperature is set to 300° C. or higher and 550° C. or lower. Preferably, the coiling temperature is 400° C. or higher and 530° C. or lower.

Through the above steps, a hot-rolled steel sheet having a microstructure of bainite or martensite having a high dislocation density, that is, a microstructure containing a large number of nucleation sites of austenite is obtained. In the present invention, this hot-rolled steel sheet is preferably heated to an annealing temperature and soaked at the annealing temperature under the conditions described below, thereby forming fine austenite.

Average heating rate in temperature range of 500° C. or higher and $A_1$ transformation point or lower: 5° C./s or more By heating the hot-rolled steel sheet in a temperature range of 500° C. or higher and an $A_1$ transformation point or lower, which is a recrystallization temperature range of the steel of the present invention, at an average heating rate of 5° C./s or more, recrystallization during the temperature increase by heating is suppressed so as to refine austenite formed at the $A_1$ transformation point or higher. When the average heating rate is less than 5° C./s, recrystallization of ferrite occurs during the temperature increase by heating, and strain (dislocation) that has been introduced to the steel sheet (hot-rolled steel sheet) is released. Therefore, grain refining of austenite becomes insufficient. Accordingly, the average heating rate in the temperature range of 500° C. or higher and the $A_1$ transformation point or lower is set to 5° C./s or more.

Annealing temperature: ($A_3$ transformation point−20° C.) or higher and ($A_3$ transformation point+80° C.) or lower When the annealing temperature is lower than ($A_3$ transformation point−20° C.), austenite is not sufficiently formed, and the microstructure of the steel sheet desired in the present invention cannot be obtained. On the other hand, when the annealing temperature exceeds ($A_3$ transformation point+80° C.), austenite is coarsened, and the microstructure of the steel sheet desired in the present invention cannot be obtained. Accordingly, the annealing temperature is set to ($A_3$ transformation point−20° C.) or higher and ($A_3$ transformation point+80° C.) or lower.

Holding time at annealing temperature (soaking time): 10 seconds or more

When the holding time (soaking time) at the annealing temperature is less than 10 seconds, austenite is not sufficiently formed, and the microstructure of the steel sheet desired in the present invention cannot be obtained. Accordingly, the holding time (soaking time) at the annealing temperature is set to 10 seconds or more.

In the present invention, after the soaking at the annealing temperature, cooling is conducted under the following conditions, whereby part of fine austenite is subjected to martensite transformation to obtain a microstructure containing fine untransformed austenite and fine martensite.

Average cooling rate from 750° C.: 30° C./s or more

When the average cooling rate from 750° C. is less than 30° C./s, a large amount of ferrite is formed during cooling, and the microstructure of the steel sheet desired in the present invention cannot be obtained. Accordingly, the average cooling rate from 750° C. is set to 30° C./s or more. Preferably, the average cooling rate from 750° C. is 50° C./s or more.

Cooling stop temperature: 100° C. or higher and 350° C. or lower

By cooling the steel sheet to a temperature range of 100° C. or higher and 350° C. or lower at the above average cooling rate, the microstructure containing fine untransformed austenite and fine martensite is obtained. When the cooling stop temperature at the above average cooling rate exceeds 350° C., martensite transformation does not sufficiently occur. On the other hand, when the cooling stop temperature at the above average cooling rate is lower than 100° C., the amount of untransformed austenite significantly decreases. Accordingly, the cooling stop temperature at the above average cooling rate is set to 100° C. or higher and 350° C. or lower. Preferably, the cooling stop temperature is 200° C. or higher and 300° C. or lower.

In the present invention, the resulting steel sheet is subsequently reheated to the following temperature and held at the temperature, then galvanized, and optionally subjected to an alloying treatment. During the soaking, during the galvanizing treatment, and the optional alloying treatment, fine martensite is transformed to tempered martensite, and part of fine untransformed austenite is transformed to bainite or pearlite. Subsequently, when the steel sheet is cooled to room temperature, untransformed austenite remains as austenite or transforms to martensite. In embodiments of the present invention, since the martensite before reheating has a fine microstructure, the tempered martensite obtained by tempering also has a fine microstructure. Furthermore, tempered martensite having an average grain diameter of 5 μm or less is obtained.

Reheating temperature: 300° C. or higher and 600° C. or lower

By setting the reheating temperature to 300° C. or higher and 600° C. or lower, and holding the steel sheet at this temperature for 10 seconds or more, fine martensite is tempered to form tempered martensite. Here, since the martensite has a fine microstructure, the tempered martensite obtained by the tempering also has a fine microstructure, and thus tempered martensite having an average grain diameter of 5 μm or less is obtained. In untransformed austenite, the concentration of carbon (C) proceeds and the untransformed austenite is stabilized as retained austenite. However, part of the untransformed austenite may transform to martensite. When the reheating temperature is lower than 300° C., tempering of martensite is insufficient, and stability of retained austenite also becomes insufficient. Consequently, a steel sheet (substrate) microstructure having 60% or more of tempered martensite in terms of area ratio and 5% or more of retained austenite in terms of area ratio cannot be obtained. On the other hand, when the reheating temperature exceeds 600° C., untransformed austenite is easily subjected to pearlite transformation, and the microstructure desired in the present invention cannot be obtained. Accordingly, the reheating temperature is set to 300° C. or higher and 600° C. or lower. Preferably, the reheating temperature is 350° C. or higher and 500° C. or lower.

Holding time at reheating temperature: 10 seconds or more and 600 seconds or less When the holding time at the reheating temperature is less than 10 seconds, tempering of martensite is insufficient, and stability of retained austenite also becomes insufficient. Consequently, a steel sheet (substrate) microstructure having 60% or more of tempered martensite in terms of area ratio and 5% or more of retained austenite in terms of area ratio cannot be obtained. On the other hand, when the holding time at the reheating temperature exceeds 600 seconds, untransformed austenite easily transforms to bainite or pearlite, and the microstructure desired in the present invention cannot be obtained. Accordingly, the holding time at the reheating temperature is set to 10 seconds or more and 600 seconds or less. Preferably, the holding time at the reheating temperature is 20 seconds or more and 300 seconds or less.

The galvanizing treatment is preferably conducted by dipping the steel sheet obtained above in a galvanizing bath at 440° C. or higher and 500° C. or lower, and then galvanizing the steel sheet while controlling the amount of coating by gas wiping or the like. In the case where the galvanized layer is alloyed, an alloying treatment is then preferably performed by holding the steel sheet in a temperature range of 450° C. or higher and 600° C. or lower for 1 second or more and 30 seconds or less. As for the galvanizing bath, in the case where the alloying treatment is not performed, it is preferable to use a galvanizing bath containing Al in an amount of 0.12% or more and 0.22% or less. In contrast, in the case where the alloying treatment is performed, it is preferable to use a galvanizing bath containing Al in an amount of 0.08% or more and 0.18% or less.

A description has been made of a case where the above-described heat treatment is performed on a hot-rolled steel sheet and a galvanizing treatment is then performed. Alternatively, in the present invention, a hot-rolled steel sheet may be pickled and then cold-rolled to form a cold-rolled steel sheet, the above-described heat treatment may be performed on the cold-rolled steel sheet, the galvanizing treatment may then be performed, and the alloying treatment may be optionally performed. In the case where cold rolling is performed, the conditions for the cold rolling are not particularly limited. However, the cold rolling reduction is preferably set to 40% or more. Furthermore, in order to reduce the rolling load during the cold rolling, hot-rolled steel sheet annealing may be performed on the hot-rolled steel sheet after coiling.

In addition, temper rolling may be performed on a steel sheet obtained after the galvanizing treatment and the optional alloying treatment in order to, for example, correct the shape or to adjust the surface roughness of the steel sheet. Furthermore, a paint treatment such as a resin coating or an oil-and-fat coating may also be performed.

EXAMPLES

Steels having the compositions shown in Table 1 were produced in a converter, and continuously cast to obtain steel slabs. These steel slabs were heated to 1,200° C. Subsequently, rough rolling was performed, and finish rolling was performed at the finish rolling temperatures shown in Tables 2 and 3. Subsequently, the resulting steel sheets were cooled to a coiling temperature at an average cooling rate of 30° C./s, coiled at the coiling temperatures shown in Table 2 and 3 to form hot-rolled steel sheets having a thickness of 2.3 mm. Heat treatment was performed on the hot-rolled steel sheets. As for some of the steel slabs, after the steel slabs were formed into hot-rolled steel sheets having a thickness of 3.0 mm, the hot-rolled steel sheets were pickled and then cold-rolled to form cold-rolled steel sheets having a thickness of 1.4 mm. Heat treatment was performed on the cold-rolled steel sheets. The heat treatment conditions are shown in Tables 2 and 3. The heat treatment of all the steel sheets was conducted in a continuous galvanizing line. The steel sheets (substrates) after the heat treatment were dipped in a galvanizing bath at 460° C. containing Al in an amount of 0.15% by mass to form a galvanized layer with a coating weight (per one side) of 35 to 45 g/m². Thus, galvanized steel sheets were obtained. Furthermore, for some of the steel sheets, after the galvanized layer was formed, an alloy treatment was conducted at 520° C., and the resulting steel sheets were cooled at a cooling rate of 10° C./s. Thus, galvannealed steel sheets were obtained.

TABLE 1

| Steel | Chemical composition (mass %) | | | | | | | | | | Ti/N | $A_1$ transformation point (° C.) | $A_3$ transformation point (° C.) | Remark |
| | C | Si | Mn | P | S | Al | N | Ti | B | Others | | | | |
| --- | --- | --- | --- | --- | --- | --- | --- | --- | --- | --- | --- | --- | --- | --- |
| A | 0.13 | 1.5 | 2.5 | 0.022 | 0.003 | 0.029 | 0.003 | 0.02 | 0.001 | — | 6.67 | 723 | 878 | Invention Example |
| B | 0.41 | 1.4 | 1.8 | 0.019 | 0.001 | 0.034 | 0.002 | 0.03 | 0.003 | — | 15 | 724 | 820 | Invention Example |
| C | 0.20 | 1.0 | 2.0 | 0.020 | 0.003 | 0.400 | 0.002 | 0.02 | 0.002 | — | 10 | 719 | 851 | Invention Example |
| D | 0.08 | 0.5 | 3.2 | 0.008 | 0.005 | 0.037 | 0.003 | 0.03 | 0.0005 | Cr: 0.41 | 10 | 703 | 798 | Invention Example |
| E | 0.25 | 1.8 | 2.1 | 0.025 | 0.002 | 0.026 | 0.004 | 0.04 | 0.001 | Mo: 0.20 | 10 | 734 | 874 | Invention Example |
| F | 0.12 | 0.5 | 1.3 | 0.013 | 0.002 | 0.028 | 0.002 | 0.03 | 0.004 | V: 0.10 | 15 | 720 | 866 | Invention Example |
| G | 0.19 | 1.5 | 2.2 | 0.016 | 0.004 | 0.032 | 0.003 | 0.03 | 0.003 | Ni: 0.51 | 10 | 715 | 856 | Invention Example |
| H | 0.11 | 0.7 | 2.7 | 0.009 | 0.002 | 0.029 | 0.003 | 0.02 | 0.002 | Cu: 0.19 | 6.67 | 705 | 829 | Invention Example |
| I | 0.22 | 1.0 | 1.9 | 0.015 | 0.005 | 0.031 | 0.004 | 0.02 | 0.002 | Nb: 0.04 | 5 | 720 | 849 | Invention Example |
| J | 0.10 | 1.7 | 2.4 | 0.011 | 0.002 | 0.021 | 0.002 | 0.02 | 0.003 | Ca: 0.004 | 10 | 729 | 900 | Invention Example |
| K | 0.35 | 1.1 | 0.9 | 0.007 | 0.004 | 0.030 | 0.004 | 0.03 | 0.002 | REM: 0.002 | 7.5 | 733 | 849 | Invention Example |
| L | 0.02 | 1.5 | 2.1 | 0.020 | 0.001 | 0.021 | 0.004 | 0.03 | 0.001 | — | 7.5 | 731 | 920 | Comparative Example |
| M | 0.15 | 1.3 | 4.2 | 0.016 | 0.003 | 0.044 | 0.003 | 0.02 | 0.003 | — | 6.67 | 697 | 807 | Comparative Example |
| N | 0.15 | 0.9 | 0.4 | 0.009 | 0.002 | 0.032 | 0.002 | 0.01 | 0.002 | — | 5 | 739 | 910 | Comparative Example |
| O | 0.15 | 1.5 | 1.4 | 0.009 | 0.002 | 0.032 | 0.002 | — | 0.001 | — | — | 737 | 908 | Comparative Example |
| P | 0.12 | 1.2 | 1.5 | 0.010 | 0.003 | 0.035 | 0.003 | 0.03 | — | — | 10 | 731 | 897 | Comparative Example |
| Q | 0.16 | 1.0 | 2.0 | 0.015 | 0.003 | 0.031 | 0.006 | 0.01 | 0.002 | — | 1.67 | 720 | 860 | Comparative Example |

TABLE 2

| Coated steel sheet No. | Steel | Finish rolling temperature (°C.) | Hot-rolling coiling temperature (°C.) | Cold rolling | Heat treatment conditions Heating rate (°C./s) *1 | Annealing temperature (°C.) | Annealing time (s) *2 | Cooling rate (°C./s) *3 | Cooling stop temperature (°C.) | Reheating temperature (°C.) | Reheating time (s) *4 | Alloying treatment | Remark |
|---|---|---|---|---|---|---|---|---|---|---|---|---|---|
| 1 | A | 900 | 500 | Performed | 5.2 | 890 | 60 | 30 | 250 | 450 | 40 | Performed | Invention Example |
| 2 | | 900 | 500 | Performed | 5.8 | 890 | 60 | 30 | 200 | 450 | 40 | Not performed | Invention Example |
| 3 | | 900 | 600 | Performed | 5.8 | 890 | 60 | 30 | 250 | 450 | 40 | Performed | Comparative Example |
| 4 | | 900 | 500 | Performed | 6.0 | 750 | 60 | 60 | 250 | 450 | 50 | Performed | Comparative Example |
| 5 | | 900 | 500 | Performed | 5.6 | 980 | 60 | 60 | 250 | 450 | 50 | Performed | Comparative Example |
| 6 | | 900 | 500 | Performed | 5.8 | 900 | 60 | 60 | 80 | 450 | 50 | Performed | Comparative Example |
| 7 | B | 850 | 550 | Not performed | 5.1 | 870 | 90 | 100 | 220 | 500 | 50 | Performed | Invention Example |
| 8 | | 850 | 550 | Not performed | 3.5 | 870 | 80 | 100 | 200 | 500 | 50 | Performed | Comparative Example |
| 9 | | 850 | 550 | Not performed | 6.2 | 840 | 5 | 100 | 200 | 500 | 50 | Performed | Comparative Example |
| 10 | | 850 | 650 | Not performed | 5.5 | 840 | 60 | 120 | 250 | 420 | 50 | Performed | Comparative Example |
| 11 | | 850 | 500 | Not performed | 6.5 | 860 | 40 | 100 | 50 | 400 | 50 | Performed | Comparative Example |
| 12 | C | 900 | 550 | Not performed | 6.2 | 860 | 120 | 30 | 270 | 450 | 60 | Not performed | Invention Example |
| 13 | | 900 | 550 | Not performed | 6.1 | 860 | 60 | 15 | 200 | 450 | 60 | Not performed | Comparative Example |
| 14 | | 900 | 550 | Not performed | 6.0 | 860 | 60 | 30 | 80 | 450 | 120 | Not performed | Comparative Example |
| 15 | D | 900 | 500 | Not performed | 5.5 | 800 | 150 | 70 | 230 | 350 | 70 | Performed | Invention Example |
| 16 | | 900 | 500 | Performed | 5.8 | 800 | 60 | 150 | 30 | 350 | 70 | Performed | Comparative Example |
| 17 | | 900 | 500 | Performed | 6.0 | 800 | 90 | 100 | 370 | 450 | 70 | Performed | Comparative Example |
| 18 | E | 900 | 500 | Performed | 10 | 900 | 75 | 80 | 240 | 400 | 30 | Performed | Invention Example |
| 19 | | 900 | 600 | Performed | 10 | 900 | 70 | 80 | 250 | 500 | 10 | Performed | Comparative Example |
| 20 | | 900 | 500 | Performed | 9.5 | 900 | 60 | 80 | 240 | 650 | 50 | Performed | Comparative Example |
| 21 | | 900 | 500 | Performed | 9.8 | 900 | 75 | 80 | 200 | 250 | 50 | Performed | Comparative Example |

*1) Average heating rate from 500° C. to A₁ transformation point (° C./s)
*2) Holding time at annealing temperature (s)
*3) Average cooling rate from 750° C. to cooling stop temperature (° C./s)
*4) Holding time at reheating temperature (s)

TABLE 3

| Coated steel sheet No. | Steel | Finish rolling temperature (° C.) | Hot-rolling coiling temperature (° C.) | Cold rolling | Heat treatment conditions | | |
|---|---|---|---|---|---|---|---|
| | | | | | Heating rate (° C./s) *1 | Annealing temperature (° C.) | Annealing time (s) *2 |
| 22 | F | 900 | 450 | Performed | 5.2 | 890 | 300 |
| 23 | | 900 | 450 | Performed | 5.8 | 890 | 300 |
| 24 | | 900 | 450 | Performed | 6.0 | 890 | 300 |
| 25 | G | 900 | 500 | Performed | 5.8 | 890 | 60 |
| 26 | | 900 | 500 | Performed | 7.2 | 870 | 90 |
| 27 | H | 900 | 500 | Performed | 6.5 | 860 | 40 |
| 28 | I | 900 | 500 | Performed | 6.0 | 890 | 120 |
| 29 | J | 950 | 400 | Performed | 5.5 | 900 | 150 |
| 30 | K | 900 | 450 | Performed | 5.2 | 900 | 50 |
| 31 | L | 940 | 500 | Performed | 5.8 | 940 | 60 |
| 32 | M | 850 | 500 | Performed | 5.2 | 850 | 60 |
| 33 | N | 950 | 500 | Performed | 5.2 | 950 | 75 |
| 34 | O | 920 | 500 | Performed | 5.2 | 920 | 75 |
| 35 | P | 910 | 500 | Performed | 6.5 | 910 | 75 |
| 36 | Q | 900 | 500 | Performed | 5.2 | 900 | 75 |

| Coated steel sheet No. | Heat treatment conditions | | | | Alloying treatment | Remark |
|---|---|---|---|---|---|---|
| | Cooling rate (° C./s) *3 | Cooling stop temperature (° C.) | Reheating temperature (° C.) | Reheating time (s) *4 | | |
| 22 | 50 | 300 | 500 | 40 | Not performed | Invention Example |
| 23 | 50 | 300 | 500 | 700 | Not performed | Comparative Example |
| 24 | 50 | 300 | 500 | 0 | Not performed | Comparative Example |
| 25 | 130 | 200 | 450 | 120 | Performed | Invention Example |
| 26 | 80 | 220 | 430 | 10 | Performed | Invention Example |
| 27 | 100 | 200 | 400 | 50 | Performed | Invention Example |
| 28 | 30 | 270 | 440 | 150 | Not performed | Invention Example |
| 29 | 150 | 200 | 350 | 70 | Performed | Invention Example |
| 30 | 70 | 240 | 400 | 30 | Performed | Invention Example |
| 31 | 30 | 270 | 400 | 40 | Performed | Comparative Example |
| 32 | 80 | 200 | 400 | 50 | Performed | Comparative Example |
| 33 | 80 | 300 | 400 | 50 | Performed | Comparative Example |
| 34 | 40 | 200 | 400 | 50 | Performed | Comparative Example |
| 35 | 30 | 200 | 400 | 50 | Performed | Comparative Example |
| 36 | 30 | 200 | 400 | 80 | Performed | Comparative Example |

*1) Average heating rate from 500° C. to $A_1$ transformation point (° C./s)
*2) Holding time at annealing temperature (s)
*3) Average cooling rate from 750° C. to cooling stop temperature (° C./s)
*4) Holding time at reheating temperature (s)

Test specimens were prepared from the coated steel sheets (Nos. 1 to 36) obtained above, the area ratios of tempered martensite, retained austenite, ferrite, and martensite, and the average grain diameter of the tempered martensite were determined in accordance with the methods described above. Note that, in determining the area ratios, image processing was conducted using commercially available image processing software (Image-Pro manufactured by Media Cybernetics, Inc.).

Furthermore, the tensile strength, the total elongation, the hole expansion ratio (stretch flangeability), and crash energy absorption (crashworthiness) were determined in accordance with the test methods described below.

<Tensile Test>

JIS No. 5 tensile test specimens (JIS 22201) were prepared from the coated steel sheets (Nos. 1 to 36) in a direction perpendicular to the rolling direction. A tensile test in accordance with JIS Z 2241 was conducted at a strain rate of $10^{-3}/s$ to measure the tensile strength (TS) and the total elongation (EL).

<Hole Expansion Test>

Test specimens each having a size of 150 mm×150 mm were prepared from the coated steel sheets (Nos. 1 to 36). A hole expansion test was conducted three times for each coated steel sheet in accordance with a hole expansion test method (JFST1001-1996) specified in the standard of the Japan Iron and Steel Federation. An average hole expansion ratio λ (%) was determined from the results of the test performed three times to evaluate the stretch flangeability.

[Impact Tensile Test]

Test specimens each having a width of a parallel portion of 5 mm and a length of 7 mm were prepared from the coated steel sheets (Nos. 1 to 36) so that a tensile test direction is a direction perpendicular to the rolling direction. A tensile test was conducted at a strain rate of 2,000/s using an impact tensile tester to which a Hopkinson bar method is applied. Absorbed energy (AE) up to an amount of strain of 5% was determined to evaluate crash energy absorption (crashworthiness) (refer to "Tetsu to Hagane (Journal of the Iron and Steel Institute of Japan)", The Iron and Steel Institute of Japan, vol. 83 (1997), No. 11, p. 748-753). The absorbed energy (AE) was determined by integrating a stress-true strain curve in a range of the amount of strain of 0% to 5%. The evaluation results are shown in Tables 4 and 5.

TABLE 4

| Coated steel sheet No. | Microstructure *5 | | | | | | Tensile property values | | | | | | |
|---|---|---|---|---|---|---|---|---|---|---|---|---|---|
| | F area ratio (%) | M area ratio (%) | TM area ratio (%) | Retained γ area ratio (%) | TM average grain diameter (μm) | Others | Tensile strength TS (MPa) | Total elongation EL (%) | TS × EL (mPa · %) | Absorbed energy up to 5% AE (MJ/m³) | λ (%) | AE/TS | Remark |
| 1 | 0 | 0 | 78 | 12 | 3.4 | B | 1333 | 16 | 21328 | 79 | 56 | 0.059 | Invention Example |
| 2 | 0 | 0 | 85 | 15 | 3.5 | — | 1378 | 17 | 23426 | 80 | 63 | 0.058 | Invention Example |
| 3 | 0 | 0 | 80 | 11 | 7.5 | B | 1340 | 15 | 20100 | 56 | 52 | 0.042 | Comparative Example |
| 4 | 28 | 0 | 55 | 12 | 3.6 | B | 1098 | 20 | 21960 | 50 | 35 | 0.046 | Comparative Example |
| 5 | 0 | 0 | 80 | 10 | 8.5 | B | 1314 | 14 | 18396 | 51 | 57 | 0.039 | Comparative Example |
| 6 | 0 | 0 | 97 | 3 | 3.1 | — | 1312 | 7 | 9184 | 74 | 72 | 0.056 | Comparative Example |
| 7 | 0 | 8 | 64 | 14 | 4.3 | B + P | 1306 | 18 | 23508 | 68 | 50 | 0.052 | Invention Example |
| 8 | 0 | 9 | 70 | 15 | 7.8 | B + P | 1319 | 17 | 22423 | 61 | 50 | 0.046 | Comparative Example |
| 9 | 15 | 0 | 53 | 3 | 3.5 | B + P | 1135 | 18 | 20430 | 58 | 38 | 0.051 | Comparative Example |
| 10 | 0 | 10 | 50 | 7 | 8.8 | B | 1583 | 14 | 22162 | 65 | 35 | 0.041 | Comparative Example |
| 11 | 0 | 0 | 96 | 4 | 2.2 | — | 1426 | 9 | 12834 | 97 | 70 | 0.068 | Comparative Example |
| 12 | 0 | 7 | 66 | 13 | 3.3 | B | 1391 | 17 | 23647 | 77 | 55 | 0.055 | Invention Example |
| 13 | 25 | 0 | 53 | 12 | 3.1 | B | 1091 | 22 | 24002 | 52 | 28 | 0.048 | Comparative Example |
| 14 | 0 | 0 | 96 | 4 | 3.3 | — | 1322 | 8 | 10576 | 68 | 68 | 0.051 | Comparative Example |
| 15 | 0 | 5 | 81 | 7 | 2.8 | B | 1202 | 12 | 14424 | 74 | 56 | 0.062 | Invention Example |
| 16 | 0 | 0 | 98 | 2 | 2.8 | — | 1169 | 7 | 8183 | 81 | 65 | 0.069 | Comparative Example |
| 17 | 0 | 54 | 23 | 5 | 2.6 | B | 1407 | 6 | 8442 | 80 | 34 | 0.057 | Comparative Example |
| 18 | 0 | 0 | 74 | 13 | 2.1 | B | 1460 | 17 | 24820 | 98 | 58 | 0.067 | Invention Example |
| 19 | 0 | 0 | 75 | 13 | 5.6 | B | 1492 | 16 | 23872 | 69 | 62 | 0.046 | Comparative Example |
| 20 | 0 | 0 | 75 | 2 | 2.3 | P | 1123 | 14 | 15722 | 65 | 32 | 0.058 | Comparative Example |
| 21 | 0 | 19 | 80 | 1 | 2.1 | — | 1520 | 6 | 9120 | 85 | 40 | 0.056 | Comparative Example |

*5) F: Ferrite M: Martensite TM: Tempered martensite γ: Austenite P: Pearlite B: Bainite

TABLE 5

| Coated steel sheet No. | Microstructure *5 | | | | | | Tensile property values | | | | | | |
|---|---|---|---|---|---|---|---|---|---|---|---|---|---|
| | F area ratio (%) | M area ratio (%) | TM area ratio (%) | Retained γ area ratio (%) | TM average grain diameter (μm) | Others | Tensile strength TS (MPa) | Total elongation EL (%) | TS × EL (mPa · %) | Absorbed energy up to 5% AE (MJ/m³) | λ (%) | AE/TS | Remark |
| 22 | 0 | 4 | 80 | 8 | 1.9 | B | 1216 | 14 | 17024 | 76 | 62 | 0.063 | Invention Example |
| 23 | 0 | 0 | 80 | 1 | 1.9 | B + P | 957 | 13 | 12441 | 68 | 76 | 0.071 | Comparative Example |
| 24 | 0 | 10 | 80 | 0 | 1.8 | B | 1277 | 6 | 7662 | 94 | 53 | 0.074 | Comparative Example |

TABLE 5-continued

| | Microstructure *5 | | | | | Tensile property values | | | | | | |
|---|---|---|---|---|---|---|---|---|---|---|---|---|
| Coated steel sheet No. | F area ratio (%) | M area ratio (%) | TM area ratio (%) | Retained γ area ratio (%) | TM average grain diameter (μm) | Others | Tensile strength TS (MPa) | Total elongation EL (%) | TS × EL (mPa · %) | Absorbed energy up to 5% AE (MJ/m³) | λ (%) | AE/TS | Remark |
| 25 | 0 | 0 | 84 | 16 | 2.7 | — | 1467 | 17 | 24939 | 93 | 59 | 0.063 | Invention Example |
| 26 | 0 | 9 | 81 | 10 | 2.5 | — | 1501 | 14 | 21014 | 98 | 55 | 0.065 | Invention Example |
| 27 | 0 | 0 | 85 | 7 | 2.9 | B | 1218 | 13 | 15834 | 70 | 60 | 0.057 | Invention Example |
| 28 | 4 | 8 | 68 | 14 | 3.0 | B | 1387 | 17 | 23579 | 75 | 50 | 0.054 | Invention Example |
| 29 | 3 | 4 | 86 | 6 | 1.8 | B | 1204 | 12 | 14448 | 84 | 66 | 0.070 | Invention Example |
| 30 | 0 | 5 | 78 | 10 | 2.4 | B | 1435 | 14 | 20090 | 81 | 54 | 0.056 | Invention Example |
| 31 | <u>64</u> | 5 | <u>29</u> | <u>2</u> | 2.8 | — | 644 | 25 | 16100 | 29 | 62 | 0.045 | Comparative Example |
| 32 | 0 | <u>26</u> | 72 | <u>2</u> | 2.9 | — | 1475 | 8 | 11800 | 80 | 31 | 0.054 | Comparative Example |
| 33 | <u>23</u> | 0 | 64 | <u>0</u> | 3.0 | B + P | 929 | 14 | 13006 | 45 | 29 | 0.048 | Comparative Example |
| 34 | <u>25</u> | 0 | 66 | <u>2</u> | 3.0 | B | 914 | 15 | 13710 | 45 | 30 | 0.049 | Comparative Example |
| 35 | <u>28</u> | 0 | 66 | <u>0</u> | 2.9 | B | 908 | 15 | 13620 | 41 | 31 | 0.045 | Comparative Example |
| 36 | <u>26</u> | 0 | 62 | <u>1</u> | 3.2 | B | 915 | 15 | 13725 | 44 | 29 | 0.048 | Comparative Example |

*5) F: Ferrite M: Martensite TM: Tempered martensite γ: Austenite P: Pearlite B: Bainite In Comparative Examples, in any of the tensile strength (TS), the total elongation (EL), the hole expansion ratio (λ), and the absorbed energy (AE) up to an amount of strain of 5% in the case where the tensile test was conducted at a strain rate of 2,000/s, a satisfactory property cannot be achieved. In contrast, in Examples of the present invention, a high strength, e.g., tensile strength TS: 1,200 MPa or more, and excellent formability including a total elongation EL of 12% or more and a hole expansion ratio λ of 50% or more are achieved. Furthermore, in addition to a desired strength and formability, all Examples of the present invention preferably have a ratio (AE/TS) of the absorbed energy (AE) up to an amount of strain of 5% in the case where the tensile test was conducted at a strain rate of 2,000/s to the static tensile strength (TS) of 0.050 or more, and thus exhibit excellent crashworthiness.

The invention claimed is:

1. A high-strength galvanized steel sheet having excellent formability and crashworthiness, comprising a substrate and a galvanized layer provided on a surface of the substrate, wherein the substrate has a composition containing, by mass %, C: 0.05% or more and 0.5% or less, Si: 0.01% or more and 2.5% or less, Mn: 0.5% or more and 3.5% or less, P: 0.003% or more and 0.100% or less, S: 0.02% or less, Al: 0.010% or more and 0.5% or less, B: 0.0002% or more and 0.005% or less, Ti: 0.05% or less, a relationship of Ti>4N being satisfied, and the balance comprising Fe and inevitable impurities, and a microstructure containing 60% or more and 95% or less of tempered martensite in terms of area ratio and 5% or more and 20% or less of retained austenite in terms of area ratio, the tempered martensite having an average grain diameter of 5 μM or less.

2. The high-strength galvanized steel sheet according to claim 1, wherein the microstructure further contains between 0% and 10% of ferrite in terms of area ratio and/or between 0% and 10% of martensite in terms of area ratio.

3. The high-strength galvanized steel sheet according to claim 2, wherein the composition further contains at least one selected from the group consisting of, by mass %, Cr: 0.005% or more and 2.00% or less, Mo: 0.005% or more and 2.00% or less, V: 0.005% or more and 2.00% or less, Ni: 0.005% or more and 2.00% or less, and Cu: 0.005% or more and 2.00% or less.

4. The high-strength galvanized steel sheet according to claim 2, wherein the composition further contains, by mass %, Nb: 0.01% or more and 0.20% or less.

5. The high-strength galvanized steel sheet according to claim 2, wherein the composition further contains, by mass %, at least one selected from the group consisting of Ca: 0.001% or more and 0.005% or less and REM: 0.001% or more and 0.005% or less.

6. The high-strength galvanized steel sheet according to claim 2, wherein the galvanized layer is a galvannealed layer.

7. The high-strength galvanized steel sheet according to claim 1, wherein the composition further contains at least one selected from the group consisting of, by mass %, Cr: 0.005% or more and 2.00% or less, Mo: 0.005% or more and 2.00% or less, V: 0.005% or more and 2.00% or less, Ni: 0.005% or more and 2.00% or less, and Cu: 0.005% or more and 2.00% or less.

8. The high-strength galvanized steel sheet according to claim 3, wherein the composition further contains, by mass %, Nb: 0.01% or more and 0.20% or less.

9. The high-strength galvanized steel sheet according to claim 7, wherein the composition further contains, by mass %, at least one selected from the group consisting of Ca: 0.001% or more and 0.005% or less and REM: 0.001% or more and 0.005% or less.

10. The high-strength galvanized steel sheet according to claim 7, wherein the galvanized layer is a galvannealed layer.

11. The high-strength galvanized steel sheet according to claim 1, wherein the composition further contains, by mass %, Nb: 0.01% or more and 0.20% or less.

12. The high-strength galvanized steel sheet according to claim 11, wherein the composition further contains, by mass %, at least one selected from the group consisting of Ca: 0.001% or more and 0.005% or less and REM: 0.001% or more and 0.005% or less.

13. The high-strength galvanized steel sheet according to claim 11, wherein the galvanized layer is a galvannealed layer.

14. The high-strength galvanized steel sheet according to claim 1, wherein the composition further contains, by mass %, at least one selected from the group consisting of Ca: 0.001% or more and 0.005% or less and REM: 0.001% or more and 0.005% or less.

15. The high-strength galvanized steel sheet according to claim 14, wherein the galvanized layer is a galvannealed layer.

16. The high-strength galvanized steel sheet according to claim 1, wherein the galvanized layer is a galvannealed layer.

\* \* \* \* \*